United States Patent
Karmo et al.

(10) Patent No.: US 10,183,634 B1
(45) Date of Patent: Jan. 22, 2019

(54) AUTOMOTIVE DITCH MOLDING

(71) Applicant: Ford Global Technologies, LLC, Dearborn, MI (US)

(72) Inventors: Talat Karmo, Waterford, MI (US); David Lee Jarvis, Madison Heights, MI (US); Paul Kenneth Dellock, Northville, MI (US); Stuart C. Salter, White Lake, MI (US); Joseph Myszka, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/649,710

(22) Filed: Jul. 14, 2017

(51) Int. Cl.
| | |
|---|---|
| *B60R 13/04* | (2006.01) |
| *B60R 13/02* | (2006.01) |
| *B62D 25/06* | (2006.01) |
| *B60R 13/00* | (2006.01) |
| *B60J 10/00* | (2016.01) |

(52) U.S. Cl.
CPC .......... *B60R 13/04* (2013.01); *B60R 13/0206* (2013.01); *B62D 25/06* (2013.01); *B60J 10/00* (2013.01); *B60R 13/00* (2013.01)

(58) Field of Classification Search
CPC .......... B60R 13/02; B60R 13/04; B60R 13/06
USPC .......... 264/297.2; 296/901.01, 213
See application file for complete search history.

(56) References Cited

U.S. PATENT DOCUMENTS

| | | |
|---|---|---|
| 8,657,370 B1 | 2/2014 | Pierce et al. |
| 8,783,751 B2 | 7/2014 | Bland et al. |
| 2012/0312848 A1 | 12/2012 | Delusky et al. |
| 2017/0021786 A1* | 1/2017 | Lee .......... B62D 35/005 |

FOREIGN PATENT DOCUMENTS

| | | |
|---|---|---|
| CN | 201872696 U | 6/2011 |
| CN | 103723093 A | 4/2014 |
| CN | 102806876 B | 12/2015 |
| EP | 0796764 A2 | 9/1997 |

* cited by examiner

*Primary Examiner* — Dennis H Pedder
(74) *Attorney, Agent, or Firm* — Carlson, Gaskey & Olds, P.C.

(57) ABSTRACT

A disclosed roof ditch molding includes a base including side portions extending from a central portion, an outer surface and an over-mold disposed over the outer surface. The over-mold defines first and second lips that extend downward transversely from the side portions of the base.

11 Claims, 3 Drawing Sheets

AUTOMOTIVE DITCH MOLDING

TECHNICAL FIELD

This disclosure relates to an automotive roof ditch molding and method of manufacture.

BACKGROUND

Vehicle roofs include a channel referred to as a "ditch" that provides for drainage. A molding is secured within the channel to protect the vehicle roof and aid in draining water. The molding secured within the channel is commonly known as a ditch molding and typically is formed as a rigid cross-section covered by a more flexible material. Foam blocks are included between the roof ditch and the molding to provide a secure fit. Automotive manufactures continually seek improved efficiencies in part weight, cost and manufacturability.

SUMMARY

An apparatus according to an exemplary aspect of the present disclosure includes, among other things, a roof ditch molding including a base with side portions extending from a central portion and an outer surface with an over-mold disposed over the outer surface of the base. The over-mold defines first and second lips that extend transversely from the side portions of the base.

In a further non-limiting embodiment of the foregoing roof ditch molding, the base includes grooves longitudinally along the outer surface and a portion of the over-mold fills the grooves.

In a further non-limiting embodiment of the foregoing roof ditch molding, the grooves extend into a thickness of the base and the over-mold extends into the grooves from the outer surface toward an inner surface of the base.

In a further non-limiting embodiment of the foregoing roof ditch molding, the over-mold further includes a flange extending from one of the side portions.

In a further non-limiting embodiment of the foregoing roof ditch molding, the over-mold further includes a tab extending outward from each of the side portions.

In a further non-limiting embodiment of the foregoing roof ditch molding, the base includes between 6% and 18% by weight of carbon fiber.

In a further non-limiting embodiment of the foregoing roof ditch molding, the base comprises between 38% and 43% by weight of a virgin copolymer polypropylene.

In a further non-limiting embodiment of the foregoing roof ditch molding, the base comprises between 30% and 42% by weight of a recycled copolymer polypropylene.

In a further non-limiting embodiment of the foregoing roof ditch molding, the base includes between 6% and 8% by weight of a synthetic filler.

In a further non-limiting embodiment of the foregoing roof ditch molding, the base has a wall thickness between 1.5 mm and 3.5 mm.

In a further non-limiting embodiment of the foregoing roof ditch molding, the base has a density between 0.95 (g/cm$^3$) and 1.20 (g/cm$^3$).

In a further non-limiting embodiment of the foregoing roof ditch molding, the base has a Flex Modulus of between 3,250 Mpa and 8,750 Mpa.

A method according to another exemplary aspect of the present disclosure includes, among other things, a process for fabricating a roof ditch molding including extruding a base having a cross-section with side portions extending from a central portion and an outer surface, communicating the extruded base to a co-extrusion die, extruding an over-mold at least partially about the outer surface of the base to define an extruded section, and cutting the extruded section to a desired length.

In a further non-limiting embodiment of any of the foregoing processes for fabricating a roof ditch molding including extruding the over-mold to have first and second lips that extend transversely from the side portions of the base.

In a further non-limiting embodiment of any of the foregoing processes for fabricating a roof ditch molding including extruding the base to have grooves extending longitudinally along the outer surface of the base portion and filling the grooves with the over-mold from the outer surface of the base to an inner surface of the base.

In a further non-limiting embodiment of any of the foregoing processes for fabricating a roof ditch molding including extruding the over-mold to include a flange extending from one of the side portions of the base.

In a further non-limiting embodiment of any of the foregoing processes for fabricating a roof ditch molding including extruding the base to include between 6% and 18% by weight of carbon fiber, between 38% and 43% by weight of a virgin copolymer polypropylene, between 30% and 42% by weight of a recycled copolymer polypropylene and between 6% and 8% by weight of a synthetic filler.

In a further non-limiting embodiment of any of the foregoing processes for fabricating a roof ditch molding including extruding the base to include a wall thickness between 1.5 mm and 3.5 mm.

The various features and advantages of this disclosure will become apparent to those skilled in the art from the following detailed description. The drawings that accompany the detailed description can be briefly described as follows.

DETAILED DESCRIPTION

Figure 1:
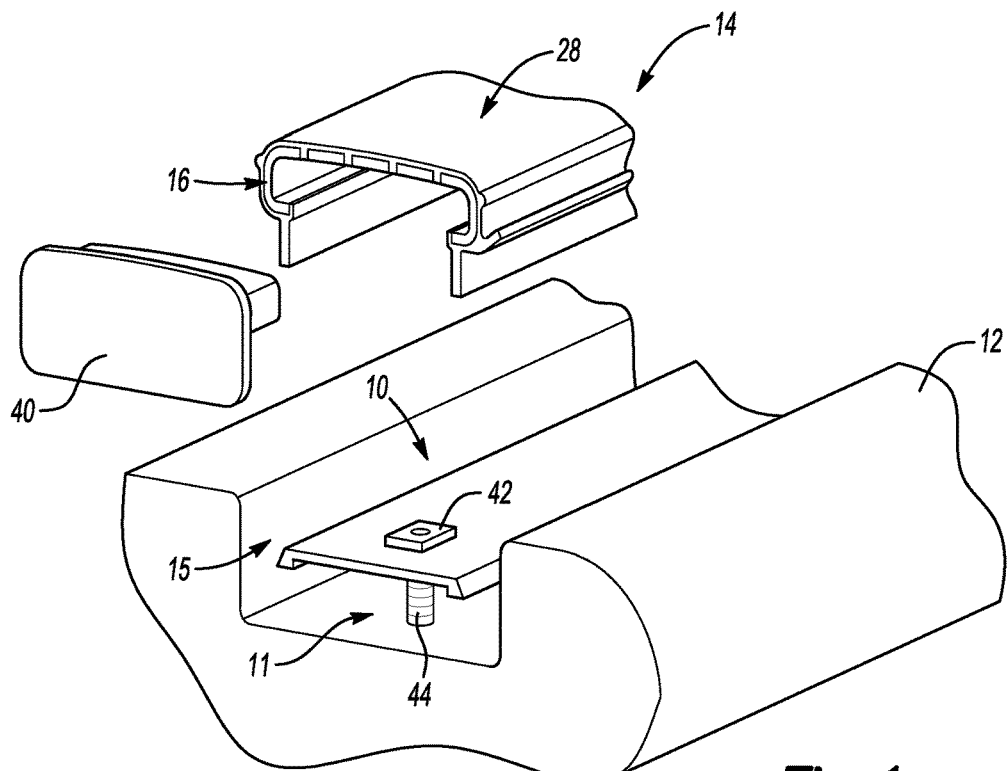
FIG. 1 is a schematic view of an example roof ditch and molding.
Figure 2:
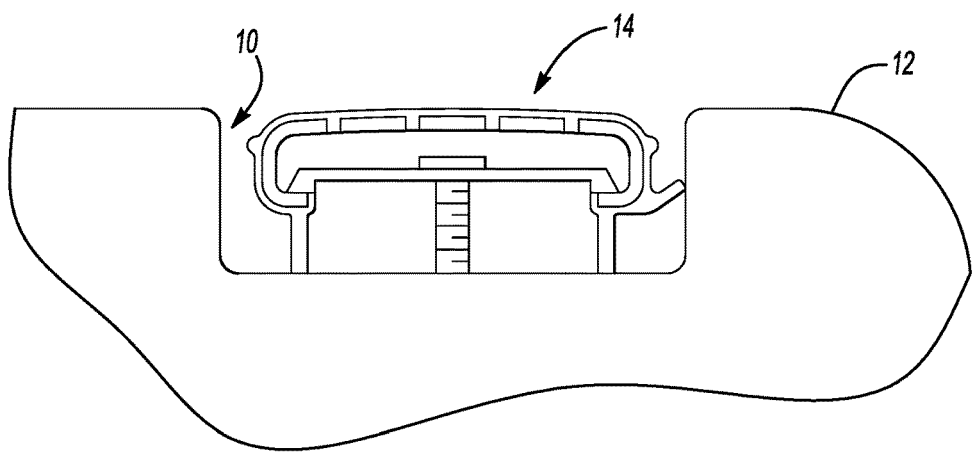
FIG. 2 is a cross-sectional view of an example roof ditch and molding.

Referring to FIGS. 1 and 2, an automotive vehicle may include a roof 12 that includes a channel referred to as a roof ditch 10. The roof ditch 10 is a channel within the roof that directs water away from sides of the vehicle and may also include the attachment weld securing roof to the vehicle. A ditch molding 14 covers the roof ditch 10 and provides a desired aesthetic appearance. The roof ditch 10 includes a bottom surface 11 and side surfaces 15. The ditch molding 14 includes sealing features that seat against the bottom surface 11 and side surface 15 of the roof ditch 10 to direct water in a desired direction.

The example ditch molding 14 includes a base 16 covered with an over-mold 28. The ditch molding 14 is secured within the ditch 10 by clips 42 that attach to anchors 44 provided within the roof ditch 10. The ditch molding 14 may also include end caps 40 at each exposed end or may abut into other features of the automotive vehicle roof and thereby not require the end caps 40.

Figure 3:
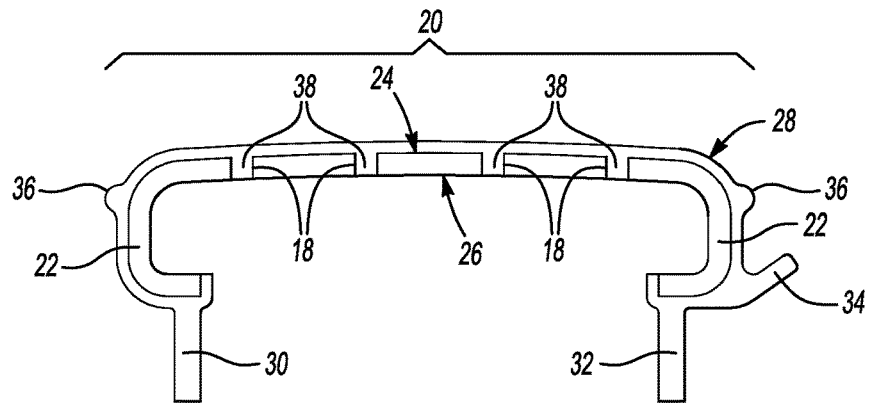
FIG. 3 is a cross-section of the example roof ditch molding.
Figure 4:
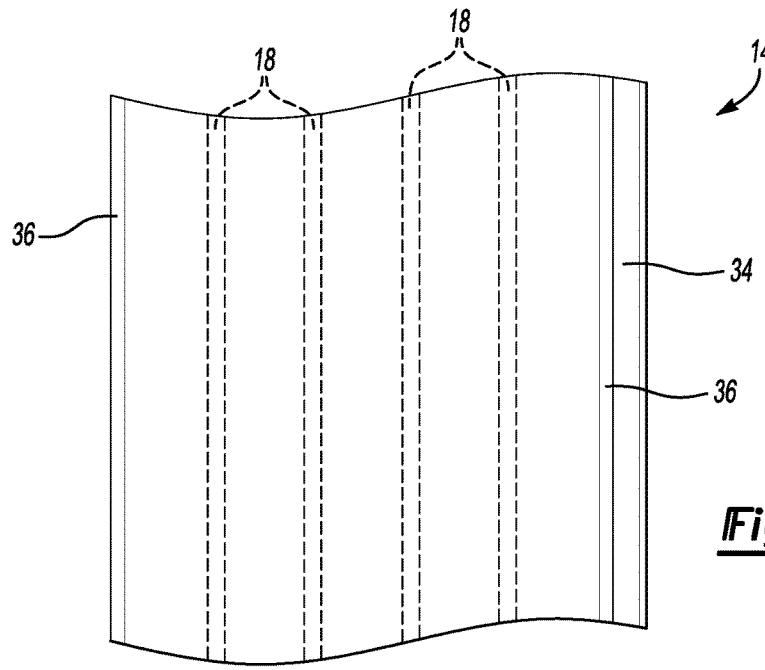
FIG. 4 is a top view of an example roof ditch molding.
Figure 5:
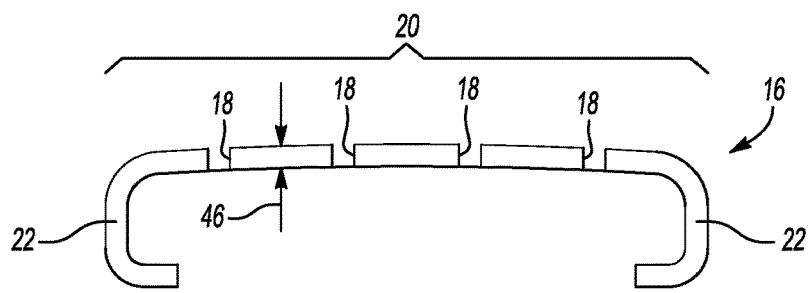
FIG. 5 is a cross-sectional view of a base of the example roof ditch molding.

Referring to FIGS. 3, 4 and 5 with continued reference to FIG. 1, the example ditch molding 14 is shown in cross-section and includes the base 16 formed from a polypropylene copolymer blend. The over-mold 28 is coextruded with the base 16 and surrounds substantially an entire outer surface 24 of the base 16.

The example base 16 includes a center portion 20 and two side portions 22. The base 16 forms a generally c-shaped cross-section with the end portions 22 extending transversely from the center portion 20. The side portions 22 include a bottom portion that curves inwardly towards each other. The center portion 20 includes several grooves 18 that extend into a thickness 46 of the base 16. The thickness 46 of the base 16 along with the grooves are configured to provide sufficient compliance in the base 16 to conform to the sweeps, curves and contours of the roof 12. The thickness 46 of the base 16 in one disclosed embodiment is between 1.50 mm (0.06 in) and 3.50 mm (0.14 in). In another disclosed embodiment, the thickness 46 is about 1.76 mm (0.7 in). In another disclosed embodiment, the thickness 46 is about 1.98 mm (0.08 in). In yet another disclosed embodiment the thickness 46 is about 3.00 mm (0.12 in). It should be appreciated that other thickness providing sufficient compliance in the base 16 are within the contemplation of this disclosure.

The over-mold 28 is molded onto the outer surface 24 of the base 16 and includes transversely extending first and second lips 30, 32. The first and second lips 30, 32 extend transversely downward from each side portion 22 of the base 16. The first and second lips 30, 32 extend downwardly when installed within the roof ditch 10 to contact the bottom surface 11 of the roof ditch 10. In the disclosed example, the lips 30, 32 extend downwardly from each of the side portions 22 and are parallel to each other across the open part of the C-shaped base 16. The contact between the lips 30, 32 and the bottom surface 11 of the roof ditch 10 provide a desirable firm solid fit and feel when installed.

The over-mold 28 also includes a side extending flange 34 on one side that engages one of the side surfaces 15 of the roof ditch 10. The over-mold 28 further includes tabs 36 on each side that are substantially of a same size and configuration and further aid in providing sealing contact with the side surface 15 of the roof ditch 10. The first lip 30, second lip 32, flange 34 and tabs 36 extend the entire longitudinal length of the ditch molding 14.

The over-mold 28 is molded to the base 16 such that portions 38 of the over-mold 28 extend through the grooves 18. The portions 38 of the over-mold 28 extend into the grooves 18 from the outer surface 24 of the base 16 toward the inner surface 26 of the base 16. The grooves 18 extend longitudinally the length of the ditch molding 14. The grooves provide a desired compliance in the base 16 that enables flexing side to side and along the length to conform to curves and contours of the automotive roof 12 and roof ditch 10. Although four grooves 18 are shown, other numbers of grooves 18 could be utilized to provide sufficient compliance in the base 16 to conform to the shape of the roof 12.

Figure 6:
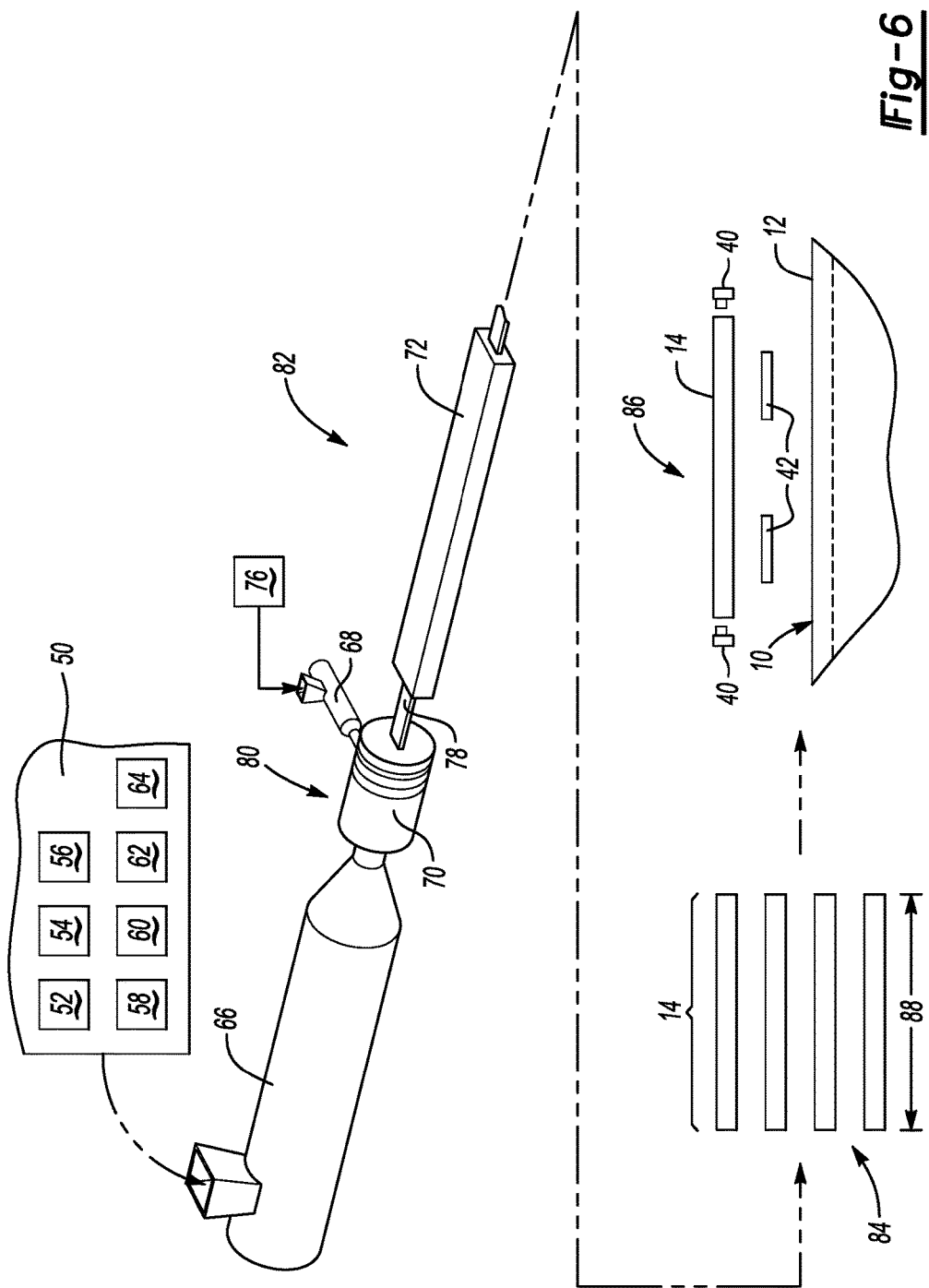
FIG. 6 is a schematic view of an example process for fabricating a roof ditch molding.

Referring to FIG. 6 with continued reference to FIG. 3, the example ditch molding 14 is fabricated using a coextruding process schematically illustrated at 80. The disclosed co-extrusion process extrudes the base 16 from a base material 50 utilizing a main extruder 66. The main extruder 66 pushes the base material 50 out into a co-extrusion die 70. In the co-extrusion die 70 the over-mold 28 is formed from an over-mold material 76 through a soft extruder 68.

The output from the co-extrusion die 70 is a continuous length of the cross-section as shown in FIG. 3 of the ditch molding 14 and schematically illustrated in FIG. 6 at 78. The continuous length of the ditch molding 14 is communicated from the co-extrusion die 70 into a water bath 72. In the water bath 72 that continuous length of the co-extrusion 78 is cooled as is schematically indicated at 82.

The cooled continuous ditch molding member 78 is then directed to a cutting station schematically illustrated at 84 where the continuous length of ditch molding 78 is cut into desired lengths 88. The cut ditch moldings 14 are then ready for assembly to the automotive roof 12 without further processing. It should be appreciated that the cross-section of the ditch molding 14 enables flexing in both the side to side direction but also longitudinally such that additional processing steps are not required. The down extending lips 30, 32 engage the bottom surface 11 of the roof ditch 10 to provide a firm desirable fit and finish without additional blocking or structures.

The ditch moldings 14 may than be assembled directly to the vehicle roof 12 as is illustrated at 86 they are assembled to the automotive roof 12 and specifically within the automotive ditch 10. The assembly step schematically illustrated at 86 includes securing the ditch molding 14 within the roof ditch 10 with the clips 42. The clips 42 are secured with the roof ditch 10 and provide a snap fit attachment of the ditch molding 14. The clips 42 are shown schematically and may include any known clip configuration. Optionally illustrated is assembly of end caps 40 to the ditch molding 14 for applications that require finishing of the ends of the ditch molding. In some applications, the ends of the roof ditch molding 14 are hidden by other roof structures that then do not require the end caps 40. Moreover, other structures as are known for concealing ends of the roof ditch 10 are within the contemplation of this disclosure.

Additionally, although it is disclosed as a single length of roof ditch molding 14 being assembled into the roof ditch 10, multiple discrete lengths may also be used to correspond with other structures secured within the roof ditch 14 and are within the contemplation of this disclosure.

The example base material 50 is a polypropylene copolymer that is formulated to provide a defined density and flex modulus corresponding with the wall thickness 46 of the base 16. The base material schematically shown at 50 includes components schematically shown in FIG. 6 that include virgin copolymer polypropylene 52, recycled polypropylene copolymer 54, a low density color concentrate 56, a stabilizer 58, a coupling agent 60, a synthetic filler 62 and carbon fiber 64 in defined formulations to provide the desired material properties. Three example disclosed formulations are defined in Table 1 below. Each component for the example formulations of the base material 50 are defined as a percentage by weight relative to the total weight in Table 1 provided below.

| PP COPOLYMER FORMULATIONS OF THE BASE MATERIAL | | | |
| --- | --- | --- | --- |
| | Formula 2 | Formula 3 | Formula 4 |
| Filler | 7% Carbon Fiber | 11% Carbon Fiber | 15% Carbon Fiber |

-continued

PP COPOLYMER FORMULATIONS OF THE BASE MATERIAL

|  | Formula 2 | Formula 3 | Formula 4 |
| --- | --- | --- | --- |
|  | Bio & Synthetic Fillers | Bio & Synthetic Fillers | Bio & Synthetic Fillers |
| Density (g/cm3) | 0.98 | 1.00 | 1.10 |
| Wall Thickness (mm) | 3 | 1.98 | 1.76 |
| Flex Modulus (Mpa) | 3,500 | 6,000 | 8,500 |
| Virgin Copolymer Poly Propylene | 41.10% | 39.10% | 42.10% |
| Recycled PP Copolymer Polymer | 41.60% | 39.10% | 31.10% |
| Low Density Color Concentrate | 1.50% | 1.50% | 1.50% |
| Stabilizer | 0.75% | 0.75% | 0.75% |
| Coupling Agent (based on Maleic Anhydride) | 1.50% | 1.50% | 1.50% |
| Synthetic Filler | 7.05% | 7.05% | 7.05% |
| Carbon Fiber | 7.00% | 11.00% | 15.00% |

The example base material 50 formulations utilize a combination of virgin and recycled polypropylene to provide a defined increase in the flexural capacity of the roof ditch molding 14 while increasing the tensile elongation of the material and maintaining a lower density to reduce overall weight.

The disclosed base material 50 formulations provide a defined flex modulus between about 3,250 Mpa and 8,750 Mpa. The disclosed base material 50 formulations also include a density within a range between 0.95 g/cm$^3$ (0.034 lb/in$^3$) and 1.20 g/cm$^3$ (0.043 lb/in$^3$). The flex modulus results at least partially from a combination of the density of the base material and the wall thickness 46 of the base 16. In one disclosed material embodiment, the base includes a wall thickness of 3 mm (0.12 in) and a density of 0.98 g/cm$^3$ (0.035 lb/in$^3$) to provide a flex modulus of 3,500 Mpa. In another disclosed material embodiment, the base includes a wall thickness of 1.98 mm (0.08 in) and a density of 1.00 g/cm$^3$ (0.036 lb/in$^3$) to provide a flex modulus of 6,000 Mpa. In another disclosed material embodiment, the base includes a wall thickness of 1.76 mm (0.7 in) and a density of 1.10 g/cm$^3$ (0.040 lb/in$^3$) to provide a flex modulus of 8,500 Mpa.

In one disclosed example formulation, the base 16 includes between 6% and 18% by weight of carbon fiber. In another disclosed embodiment, the base includes about 7.00% by weight of carbon fiber. In yet another disclosed embodiment, the base includes about 11.00% by weight of carbon fiber. In yet another disclosed embodiment, the base includes about 15.00% by weight of carbon fiber.

In one disclosed example formulation the base comprises between 38% and 43% by weight of a virgin copolymer polypropylene. In another disclosed example formulation the base comprises about 39.10% by weight of a virgin copolymer polypropylene. In another disclosed example formulation the base comprises about 41.10% by weight of a virgin copolymer polypropylene. In another disclosed example formulation the base comprises about 42.10% by weight of a virgin copolymer polypropylene.

In one example formulation, the base 16 includes between 30% and 42% by weight of a recycled copolymer polypropylene. In another example formulation, the base 16 includes about 39.10% by weight of a recycled copolymer polypropylene. In another example formulation, the base 16 includes about 31.10% by weight of a recycled copolymer polypropylene. In another example formulation, the base 16 includes about 42.60% by weight of a recycled copolymer polypropylene.

In one example formulation, the base 16 includes between 6% and 8% by weight of a synthetic filler. In another example formulation, the base 16 includes about 7.05% by weight of the synthetic filler.

In one disclosed example embodiment, the carbon fibers are recycled and are of a length between about 6 and 12 mm. It should be understood that other lengths of carbon fiber as well as the use of virgin material are within the contemplation of this disclosure.

In one disclosed example, the synthetic filler 62 is used to improve cost and improve material properties. In one disclosed example, the synthetic filler 62 comprises a magnesium oxysulfate. The filler 62 is added to reduce the coefficient of linear thermal expansion of the ditch molding 14 and increase material stiffness.

It should be appreciated, that the disclosed example formations include approximate percentages by weight for each component that may vary according to known tolerances for plastic material. Moreover, it is within the contemplation of this disclosure that other base material formulations could be utilized within the scope of this disclosure.

The example over-mold material 76 is a thermal plastic vulcanisate (TPV) that has a stiffness between 50 and 90 Shore A. The over-mold material 76 is used to cover and seal the base 16. Moreover, the over-mold material 76 is used to provide a desired texture and color of the completed ditch molding 14 that corresponds with the automotive roof and a desired aesthetic appearance. Other over-mold materials may be utilized that provide the defined flexibility and aesthetic appearance desired that are also compatible with the base material 50.

Accordingly, the disclosed example ditch molding 14 includes an overall cross-sectional shape defined by the base 16 and over-mold 28 that is sufficiently flexible to conform to contours of an automotive roof structure while maintaining a defined stiffness. The ditch molding 14 includes features that eliminate the need for additional support structures and blocks. Additionally, the base 16 is fabricated utilizing a base material 50 that incorporates carbon fibers and filler materials according to discloses formulations that provide the desired material properties that provide flexibility and stiffness.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A roof ditch molding comprising:
a base including side portions extending from a central portion and an outer surface wherein the base includes grooves extending longitudinally along the outer surface; and
an over-mold disposed over the outer surface of the base with a portion that fills the grooves, the over-mold defining first and second lips that extend away from the base transversely from the side portions of the base.

2. The roof ditch molding as recited in claim 1, wherein the grooves extend into a thickness of the base and the over-mold extends into the grooves from the outer surface toward an inner surface of the base.

3. The roof ditch molding as recited in claim 1, wherein the over-mold further includes a flange extending from one of the side portions.

4. The roof ditch molding as recited in claim 1, wherein the over-mold further includes a tab extending outward from each of the side portions.

5. The roof ditch molding as recited in claim 1, wherein the base includes between 6% and 18% by weight of carbon fiber.

6. The roof ditch molding as recited in claim 5, wherein the base includes between 38% and 43% by weight of a virgin copolymer polypropylene.

7. The roof ditch molding as recited in claim 6, wherein the base includes between 30% and 42% by weight of a recycled copolymer polypropylene.

8. The roof ditch molding as recited in claim 7, wherein the base includes between 6% and 8% by weight of a synthetic filler.

9. The roof ditch molding as recited in claim 1, wherein the base has a wall thickness between 1.5 mm and 3.5 mm.

10. The roof ditch molding as recited in claim 1, wherein the base has a density between 0.95 (g/cm$^3$) and 1.20 (g/cm$^3$).

11. The roof ditch molding as recited in claim 1, wherein the base has a Flex Modulus of between 3,250 Mpa and 8,750 Mpa.

* * * * *